Figure 1:
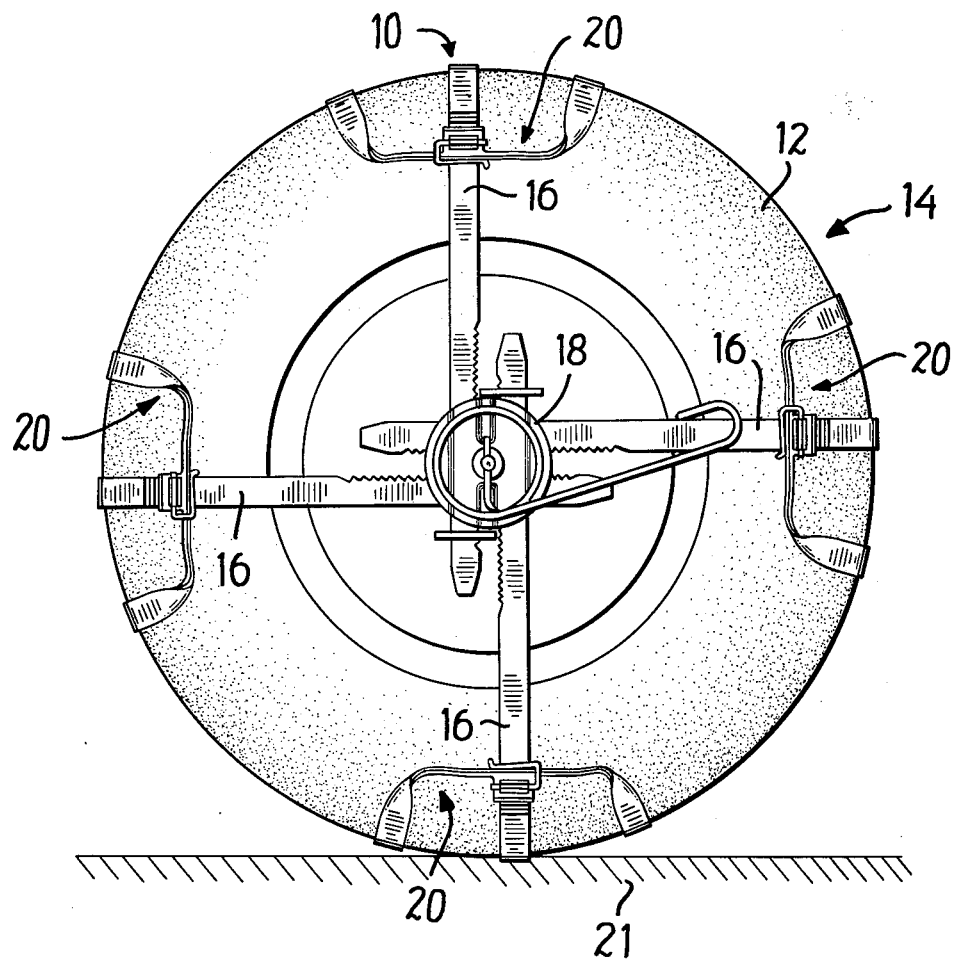

United States Patent [19]

Hyggen

[11] 4,122,880
[45] Oct. 31, 1978

[54] AUXILIARY GRIPPING MEMBERS FOR GRIPPING SHOES FOR VEHICLE WHEELS

[75] Inventor: Egil Hyggen, Oslo, Norway

[73] Assignee: Elkem-Spigerverket A/S, Oslo, Norway

[21] Appl. No.: 782,828

[22] Filed: Mar. 30, 1977

[30] Foreign Application Priority Data

Apr. 7, 1976 [NO] Norway .................................. 761185

[51] Int. Cl.² ............................................ B60C 27/04
[52] U.S. Cl. .................... 152/216; 152/218; 152/229; 403/397; 403/347
[58] Field of Search ................. 152/216, 218, 213 R, 152/221, 225 R–230; 403/397, 399, 386, 347

[56] References Cited

U.S. PATENT DOCUMENTS

| | | | |
|---|---|---|---|
| 2,596,096 | 5/1952 | Brandvold | 152/229 |
| 2,653,642 | 9/1953 | Cella | 152/225 C |
| 2,870,814 | 1/1959 | Khachikian | 152/218 |
| 3,359,019 | 12/1967 | Pinkney | 403/397 |
| 3,547,176 | 12/1970 | Kroken et al. | 152/218 |
| 3,920,208 | 2/1974 | Dowdy et al. | 403/347 |

FOREIGN PATENT DOCUMENTS

2,261,892  9/1975  France ..................................... 152/218

*Primary Examiner*—Albert J. Makay
*Assistant Examiner*—Lawrence E. Williams
*Attorney, Agent, or Firm*—Eyre, Mann, Lucas & Just

[57] ABSTRACT

An auxiliary gripping member for gripping shoes for vehicle wheels is disclosed. The auxiliary gripping members can be affixed to a gripping shoe which is attached to a gripping wheel without disassembly therefrom. In a preferred embodiment, the auxiliary gripping members are attachable without the need for tools and without creating undue stress on the mounting mechanism.

6 Claims, 4 Drawing Figures

U.S. Patent  Oct. 31, 1978  Sheet 2 of 2  4,122,880

AUXILIARY GRIPPING MEMBERS FOR GRIPPING SHOES FOR VEHICLE WHEELS

The present invention relates to a new and useful construction for an auxiliary gripping member used on a gripping shoe assembly which improves the traction of vehicle wheels under adverse conditions such as snow, mud and the like.

Gripping shoes for vehicle wheels are well known in the art. In my prior U.S. Pat. No. 3,891,018 issued June 24, 1975, I disclose a highly useful construction for a gripping shoe used on vehicle wheels. This gripping shoe consists of four J-shaped gripping members which are tightened about a vehicle wheel by means of a central hub into which the longer leg of the J-shaped gripping member projects. While this is a very excellent construction, it has been found that in certain instances the relatively large distance between adjacent gripping members (on the order of 90°) can be disadvantageous in certain circumstances. For example, there can be jerky acceleration of the vehicle which causes undesirable points of stress on portions of the vehicle such as the transmission, drive shaft and differential. Furthermore, if braking on icy conditions is effected at a time when the portion of the wheel in contact with the ground is between adjacent gripping members, the gripping members will have little or no effect in assisting in the braking operation.

It would theoretically be possible to employ a greater number of gripping members in the gripping shoe assembly. However, as the number of gripping members increases, the complexity of the central hub arrangement for attaching the gripping shoe to the vehicle wheel necessarily also increases and there is also a considerable increase in the weight of the assembly which must be handled in mounting it on a vehicle tire. Furthermore, the additional gripping members are not required under all conditions and add unnecessarily to the expense where they are not required.

I have now discovered that an auxiliary gripping member can be connected to each primary gripping member. This will substantially increase the number of traction members in contact with the road without substantially increasing the complexity of the gripping shoe assembly. The auxiliary gripping member is of value whether the number of main gripping members is as few as two or as many as six or eight or even more since in each case there will be at least a tripling of the number of traction members in contact with the surface upon which the vehicle is traveling.

In the preferred embodiment according to the present invention, the auxiliary gripping members are attachable to the main gripping members without the use of tools. In addition, they are fixedly positioned without rigid connection to the main gripping members whereby the possibility of undue stress on the mounting mechanism is substantially reduced. Furthermore, the preferred embodiment also provides that the auxiliary gripping members can be fixedly positioned in a number of different places on the main gripping member so that a single gripping shoe can still be employed for a number of different wheel diameters.

Figure 4:
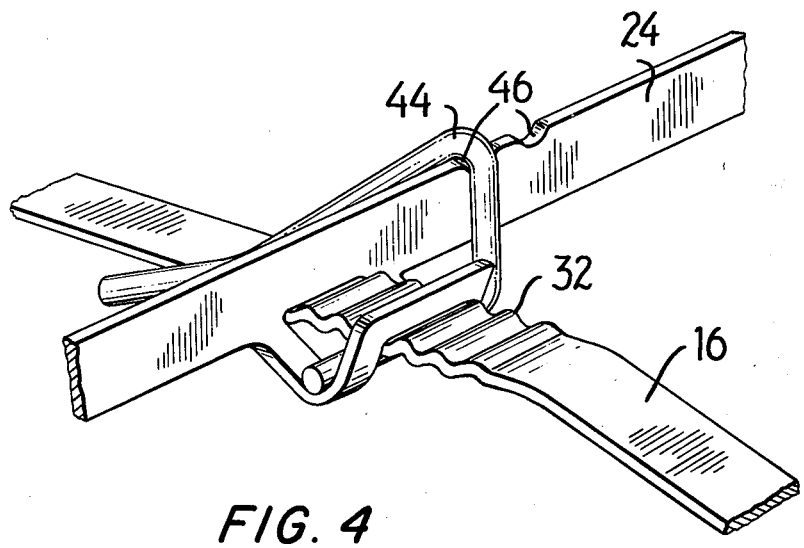
Figure 2:
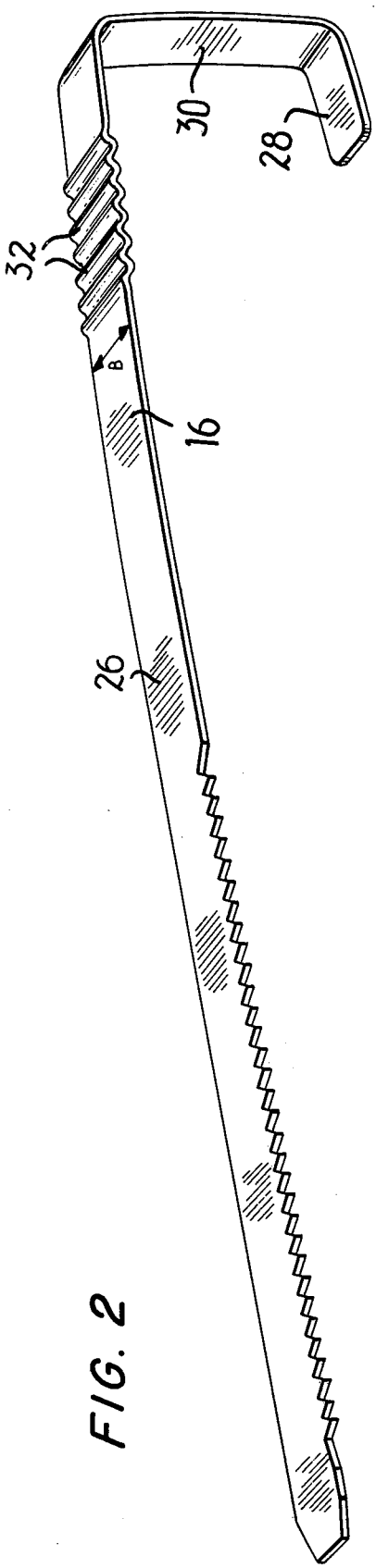
Figure 3:
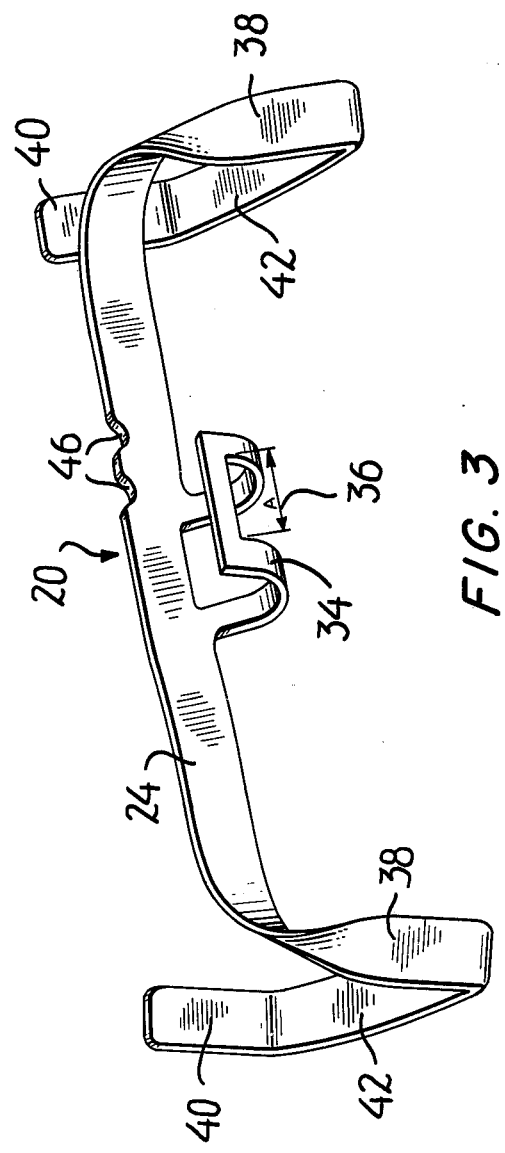

These and other aspects of the present invention may be more fully understood with reference to the drawings wherein:

FIG. 1 shows the auxiliary gripping members of the present invention affixed to main gripping members of a gripping shoe assembly; and FIGS. 2, 3, and 4 show a preferred means for affixing the auxiliary gripping member to the main gripping member.

Referring to FIG. 1, there is shown a gripping shoe assembly 10 affixed to the tire 12 of a vehicle wheel 14. The gripping shoe assembly 10 comprises a plurality of J-shaped members 16 drawn snugly about the vehicle tire 12 by means of a central hub 18 such as discussed in U.S. Pat. Nos. 3,891,018 or 3,547,176.

In accordance with the present invention, an auxiliary gripping member 20 is affixed to each main gripping member 16. The auxiliary gripping members increase the number of traction members in contact with the road surface 21 from four to twelve during each revolution of the vehicle wheel, thus substantially improving traction of the vehicle wheel. As shown, the auxiliary gripping members 20 comprise a plurality of U-shaped or J-shaped members 22 (see especially FIG. 3) joined by a connecting member 24 which in turn is affixed to the longer leg of J-shaped gripping member 16 in the portion remote from the central hub 18.

Referring now to FIGS. 2, 3, and 4, FIG. 2 shows one of the J-shaped gripping members 16 removed from the gripping shoe assembly 10. The gripping member 16 comprises a long leg 26 and a short leg 28 with a traction member 30 which connects the legs 26 and 28 and engages the road surface 21. In accordance with the preferred embodiment of the present invention, a portion of the long leg 26 remote from the central hub is made corrugated as shown at 32. The connecting member 24 of the auxiliary gripping member 20 is provided with a U-shaped member 34 having a slot 36 therein of a width A which substantially corresponds to the width B of the corrugated section 32 of the main gripping member 16. The opposed ends of the auxiliary gripping member 20 are provided with U or J-shaped members each of which comprises a leg 38 affixed to connecting member 24, a leg 40 which grips the back side of the tire and a traction member 42 connecting the legs 38 and 40.

As shown in FIG. 4, the connecting member 24 of the auxiliary gripping member 20 is affixed to the J-shaped gripping member 16 by a spring pin 44 which engages one of the corrugations 32. Because a plurality of corrugations 32 are supplied, the auxiliary gripping member 20 can be longitudinally positioned on the main gripping member 16 according to the diameter of the wheel.

The spring pin 44 preferably overlaps the connecting member 24 as shown and engages a detent 46 in the connecting member 24 to prevent it from slipping out. The spring pin is preferably made resilient, e.g., of spring steel, so that it will be maintained in position. With this construction, the auxiliary gripping member 20 is fixedly positioned on the main gripping member 16 but is not rigidly affixed thereto. In this way, the auxiliary gripping member 20 can pivot somewhat when it is under load so that there are no excessive forces applied to the main gripping member 16 or the central hub 18. It will be appreciated that a spring pin, while preferred because of ease of assembly, can be replaced by another retaining member such as a nut and bolt, a cotter pin or the like. Alternatively, the auxiliary gripping member could be rigidly affixed to the main gripping member 16 provided the main gripping member and the central hub are made of sufficient strength to withstand the pressures to which they will be subjected.

There has been described the preferred embodiment of the applicant's invention providing an auxiliary gripping member which can be readily attached and detached from the main gripping member of the gripping shoe assembly. It will be understood, however, that the claims are intended to cover all changes and modifications of the preferred embodiment of the invention, herein chosen for the purpose of illustration, which do not constitute departures from the spirit and scope of the invention.

What is claimed is:

1. In a gripping shoe assembly for vehicle wheels comprising a plurality of J-shaped gripping members and a central housing having means for drawing said plurality of J-shaped gripping members snugly about a vehicle tire, each said J-shaped member comprising a long leg and a short leg and a traction member connecting said long leg and said short, the improvement comprising an auxiliary gripping member attached to at least one said J-shaped gripping member, said auxiliary gripping member comprising at least two traction members and a connecting member therebetween, a U-shaped member attached to approximately the center of said connecting member, a slot in said U-shaped member, said long leg fitting into said slot, the ends of said slot bearing against a first face of said long leg and part of said U-shaped member projecting past the second face of said long leg, a plurality of alternating corrugations on both faces of said long leg, the ends of said slot being placed against the corrugations on the first face of said long leg and affixed there by means of a pin-like member which passes between the second face of the long leg and the U-shaped member, said pin engaging at least one of said corrugations on the second face of said long leg to fixedly position the auxiliary gripping member.

2. The gripping shoe assembly of claim 1 wherein said pin-like member is resilient and overlaps said connecting member.

3. The gripping shoe assembly of claim 2 wherein said connecting member has at least one detent for maintaining said resilient member in a predetermined position.

4. The gripping shoe assembly of claim 1 wherein there is an auxiliary gripping member attached to each said J-shaped gripping member.

5. The gripping shoe assembly of claim 4 wherein there are four J-shaped gripping members.

6. The gripping shoe assembly of claim 1 wherein the auxiliary gripping member may be attached to and removed from the J-shaped gripping member without the need for tools.

* * * * *